Jan. 29, 1935.  W. L. McNAMARA  1,989,488
TEMPERATURE CONTROL AND REGULATING DEVICE AND METHOD
Filed Dec. 27, 1929  3 Sheets-Sheet 1

INVENTOR
William L. McNamara
BY
his ATTORNEY

Jan. 29, 1935. W. L. McNAMARA 1,989,488
TEMPERATURE CONTROL AND REGULATING DEVICE AND METHOD
Filed Dec. 27, 1929 3 Sheets-Sheet 3

INVENTOR
William L. McNamara
BY
Norman N. Holland
his ATTORNEY

Patented Jan. 29, 1935

1,989,488

UNITED STATES PATENT OFFICE 1,989,488

TEMPERATURE CONTROL AND REGULATING DEVICE AND METHOD

William L. McNamara, Connellsville, Pa., assignor to Capstan Glass Company, Connellsville, Pa., a corporation of Delaware Application December 27, 1929, Serial No. 416,833

15 Claims. (Cl. 49—55)

The present invention relates to glass manufacture and more particularly to a device and method for regulating the temperature of molten glass delivered from a furnace.

In the manufacture of glassware, the raw material for the glass is melted in a large furnace about which are located a number of fabricating machines and a series of troughs or spouts projecting from the furnace to the respective machines. The machines usually comprise a series of molds on a rotatable table. Suitable feeding mechanism delivers from the troughs or spouts gobs or charges of glass to the molds on the mold table as they pass the spout. Due to the many tons of molten glass in the furnace, it is difficult to maintain the temperature constant throughout. As the temperature varies at the spout the rate of flow of the glass at this point changes. The glass becomes less viscous and flows faster as its temperature increases and the glass becomes more viscous and flows more slowly as its temperature decreases. The change in the rate of flow causes a corresponding change in the sizes of the charges delivered. This, in turn, makes the ware either underweight or overweight and, therefore, defective, if the variation exceeds a narrow margin. Another objection to changes in temperature is that each type of ware has a particular temperature which is the best working temperature. Therefore, variations from this best working temperature affect adversely the fabrication of the glass. Devices have been provided for regulation of the weight of the glass manually by observing or weighing the finished articles and thereafter making suitable adjustment of a correcting device. Other devices have been adapted to automatically control the adjustment of the weight regulating device. These devices, whether automatic or manual, only partially correct for the irregularities and fail to change or correct the basic cause for the irregularities.

The present invention is an improvement upon such devices and aims to correct automatically the basic cause for irregularities in the feeding of charges and to do this either in conjunction with the present weight regulators or independently of them; that is, the invention may be used with the present types of weight regulators to supplement their action or to take their place and to perform, in addition to their usual functions, the additional function of automatically regulating the temperature responsively to the variation in weight of the charges being delivered.

An object of the present invention is to eliminate or minimize the difficulties enumerated above and to provide more accurate regulation of glass feeding devices.

Another object of the invention is to provide a simple and effective device and method for regulating the flow of glass and for regulating the size of the delivered gobs or charges.

Another object of the invention is to provide a device and method for maintaining a predetermined rate of flow of the glass and size of charges delivered to the fabricating machines.

Another object of the invention is to provide a device and method for locally changing the temperature of the glass responsively to variations in the size of the charges delivered.

Another object of the invention is to regulate the temperature of the glass in the spout or adjacent the outlet orifice responsively to the size of gobs or charges delivered.

Another object of the invention is to vary the sizes of the charges of glass by regulating the temperature of the glass adjacent the outlet orifice.

A further object of the invention is to regulate the amount of fuel delivered to the burner for heating the stream of glass responsively to the variations in the sizes of charges delivered, thereby automatically controlling the weight and flow of the charges.

Other and further objects of the invention will be obvious upon an understanding of the illustrative embodiment about to be described or will be indicated in the appended claims and various advantages not referred to herein will occur to one skilled in the art upon employment of the invention in practice.

A preferred embodiment of the invention has been chosen for purposes of illustration and description and is shown in the accompanying drawings, forming a part of the specification, wherein Fig. 1 is a diagrammatic view illustrating the present invention applied to a glass furnace having a weight regulator thereon;

Figure 1:
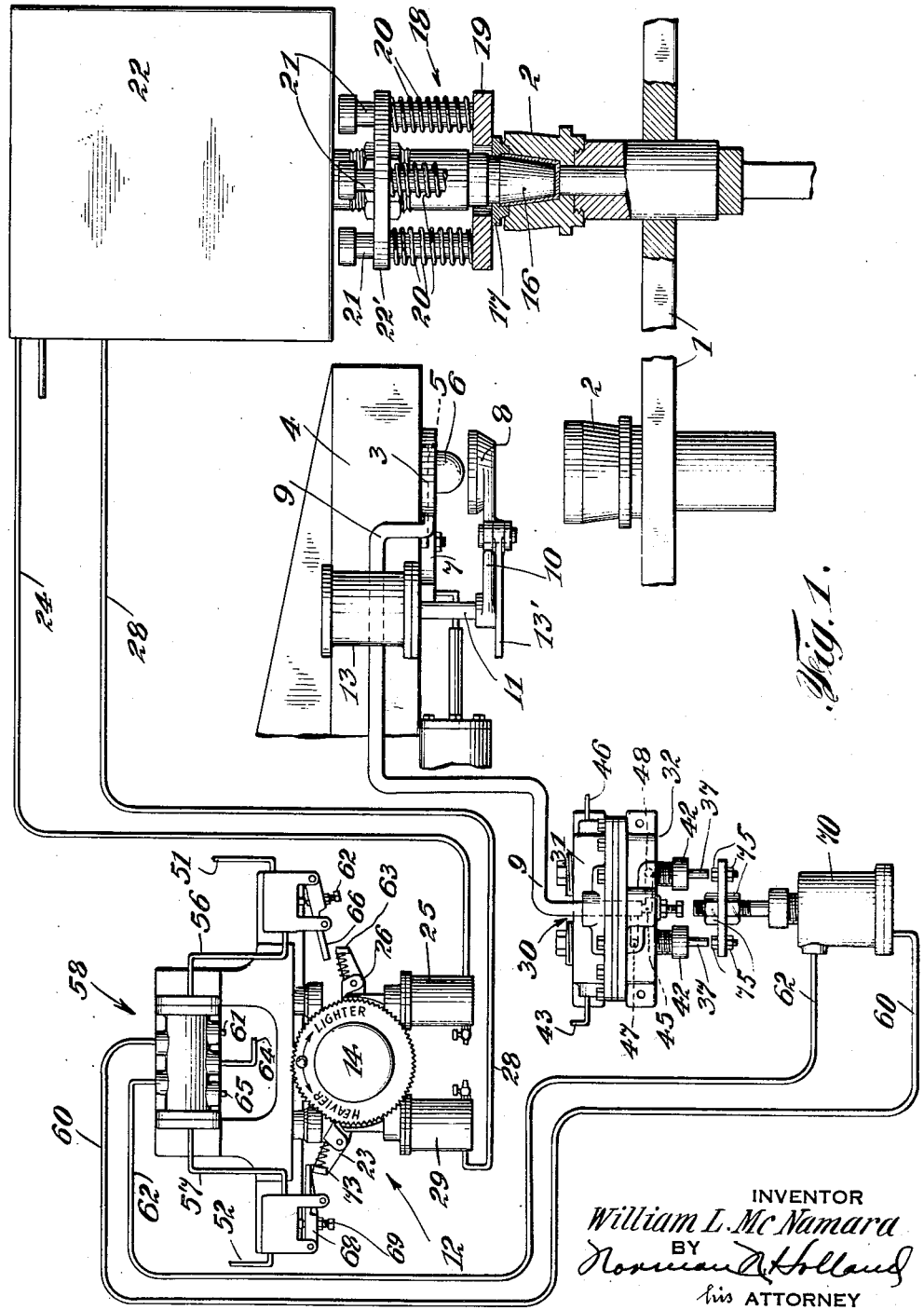

Referring again to the drawings illustrating the preferred embodiment of the invention and one way of practicing the method, there is shown a portion of a mold table 1 with molds 2 thereon. One of the molds is shown beneath a spout 4 having an outlet orifice 5 about to deliver a charge of glass 6 to the mold.

It will be understood that the spout 4 extends from a reservoir of molten glass such as a glass furnace and that the charges of glass are caused to drop from the orifice periodically in any suitable manner. A pair of shears 7 is shown herein for severing the gob at predetermined intervals. A pressure cup 8, which may if desired be in the form of a burner, is adapted substantially to envelop the outlet orifice between the delivery of successive charges and to co-operate with the burner to further heat the glass in the orifice. The pressure cup may be mounted upon an arm 10 connected to a piston rod 11 which moves in the air cylinder 13 at proper intervals to operate the pressure cup vertically in timed relation to the glass feeding mechanism. A second pneumatic cylinder having a piston rod 13' may be operated to oscillate the pressure cup horizontally to permit the glass to drop.

There is shown a weight regulator or timing mechanism 12 which may be operated by the hand wheel 14 to change the weight of the charges delivered. It is not necesary to describe the details of this mechanism because these details do not form a part of the present invention and because such devices are well known in the art. By means of the timing mechanism or weight regulator 12, the sizes of the charges or gobs may be changed within predetermined limits by turning the hand wheel 14 thereon. Turning the hand wheel in one direction increases the weight of the charges, and turning the hand wheel in the opposite direction decreases their weight.

In United States Patent No. 1,640,944, issued to Peter Kucera, there is illustrated a mechanism for automatically controlling the timing mechanism 12 responsively to variations in the size of the charges of glass delivered. Reference may be had to this patent for a detailed description of this mechanism. As shown in the drawings herein, the consecutive molds on the rotatable table 1 pass the mold charging station and, thereafter, beneath plungers 16 where the molds are forced upwardly into engagement with the plungers to press the glass into the desired shape. A suitable ring mold 17 fits about the upper periphery of the glass container and the pressure plunger to form an accurate finish for the upper portion of the ware. A suitable yoke 18 retains a pressure plate 19 against the ring mold 17. Suitable springs 20 on bolts 21 intermediate cross member 22 and the pressure plate 19 retain the plate in position in the usual manner. In this way, the upper ends of the rods or bolts 21 project through the upper part of the cross member 22 a distance depending upon the amount that the plunger 16 sinks into the mold; in other words, if the gob of glass is undersized, the plunger goes into the mold a greater distance and the amount of the projection of the upper ends of the rods is greater than if an oversized gob were fed and the plunger were able to descend a smaller distance.

The mechanism associated with the mold and plunger and illustrated diagrammatically at 22, (the details of which are described in Patent No. 1,640,944), is adapted to operate the weight regulator 12 responsively to the size of the gobs as measured by the position of the mold 2 and plunger 16, described above. The mechanism illustrated at 22 is adapted to admit air through a conduit 24 into a cylinder 25 to operate a ratchet 26 and rotate hand wheel 14 when an oversized gob of glass appears. The same mechanism is also adaped to admit air through the conduit 28 to the cylinder 29 to operate the ratchet 23 and the hand wheel 14 when an oversized gob of glass appears. In this way, a permanent adjustment is made on the weight regulator 12 responsive to the variation of the volume of the glass from a predetermined standard.

The present invention is illustrated herein as applied to the weight regulator shown in Patent No. 1,640,944, and illustrated and described in general terms herein. It will be understood, of course, that while the present invention is shown applied directly to the weight regulator, it may also be operated directly by the pistons in the cylinders 25 and 29 to control the temperature of the glass and thereby control the weight of the gobs of glass delivered. In this way, the invention may be utilized to supersede the usual weight regulators, although, in the preferred form as illustrated herein, the invention supplements the action of the weight regulator.

In the illustrative embodiment, the conduit 9 for supplying fuel to the burner 3 is shown connected through a valve mechanism or a valve box 30, which may comprise a pair of castings 31 and 32 with a plate 34 interposed therebetween having valve seats 35 thereon. The lower plate 32 has suitable housings or bearings 36 for the valve stems 37, the poppet valves 38 being held in position by the springs 39 on seats 40. The lower ends of the valve stems have a suitable packing joint 41 which may comprise a cap 42 threaded to the casting 32 and a sleeve or bushing 44 of suitable packing material. The lower ends of the valve stems are permitted to extend through and project below the caps 42 for purposes to be described hereinafter. One of the poppet valves 38 and its corresponding chamber is adapted to control a gas line 43 and the other poppet valve 38 is adapted to control an air line 46. When the two valves are opened, as described hereinafter, air and gas are permitted to flow through conduits 47 and 48 into the conduit 9 for the burner 3. In some cases, it may be desirable to supply the burner with a small amount of fuel at all times and to increase the amount by opening the valves 38 further. This may be accomplished by a separate fuel conduit or by means of the adjustment nuts 75.

Figure 2:
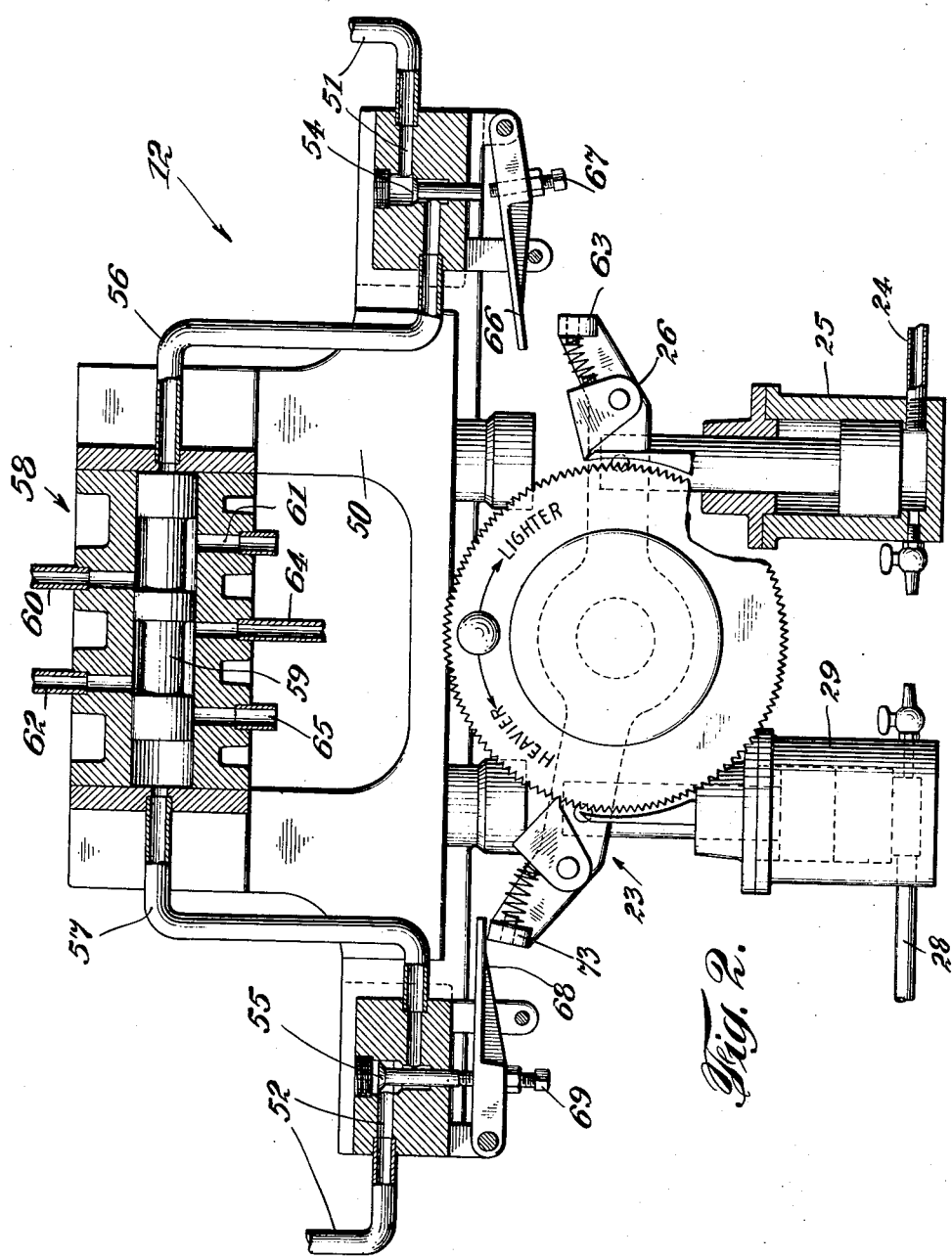
Fig. 2 is a front elevational view, partly in section, of the weight regulator.
Figure 3:
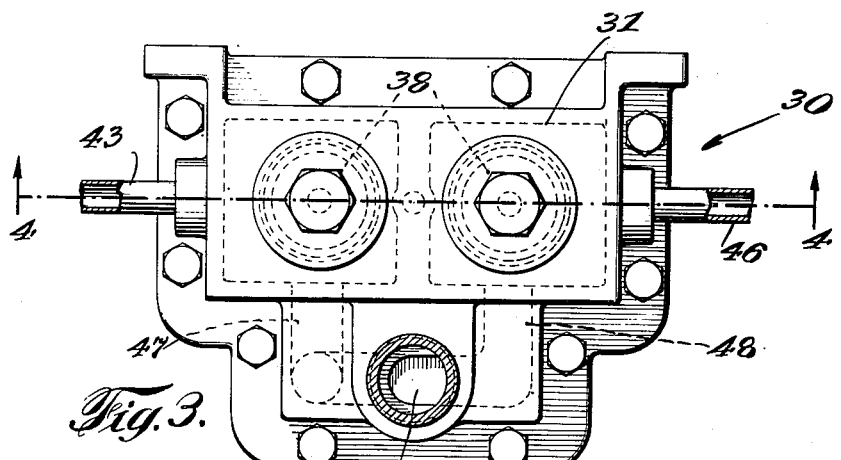
Fig. 3 is a top plan view of the valve control for the burner.
Figure 4:
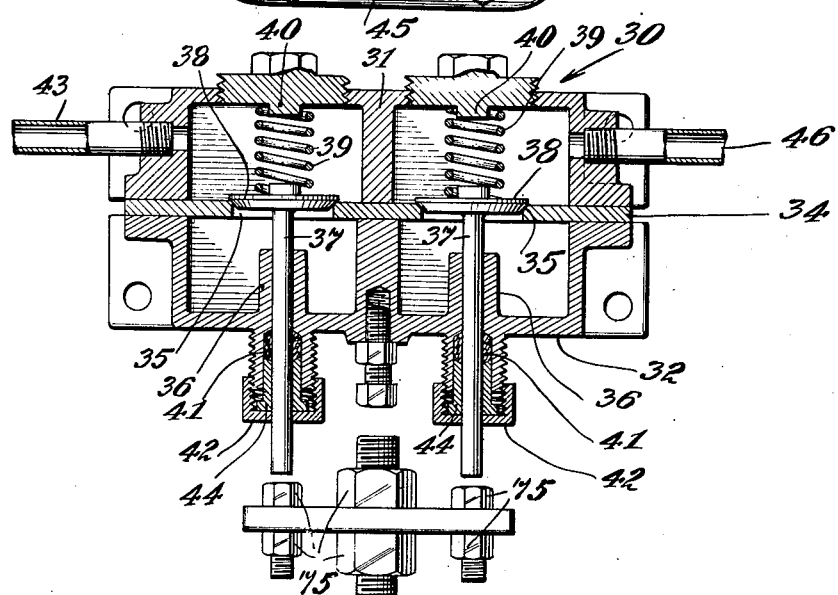
Fig. 4 is a sectional view illustrating the temperature control in position to decrease the temperature of the glass.

The valves 38 may be controlled responsively to the variations in the sizes of the delivered charges by any suitable mechanism. As illustrated herein, a suitable casting 50 may be provided and mounted upon the weight regulator 12. At each end of the casting there are provided conduits 51 and 52 leading from suitable sources of compressed air controlled by poppet valves 54 and 55 respectively. The other ends of the conduits 51 and 52 are connected to opposite ends 56 and 57 respectively of a control valve 58. This valve may be similar to those used in various glass machinery and is shown herein comprising a sliding member 59 which, when shifted to the right, as shown in Fig. 2, is adapted to connect a conduit 60 to atmosphere through the conduit 61 and, at the same time, to connect a conduit 62 to the compressed air supply through conduit 64. When the valve is shifted to the left, the conduit 60 is connected to the compressed air supply through conduit 64 and the conduit 62 is connected to the exhaust conduit 65.

The sliding member 59 of the control valve 58 is reciprocated from one side to the other by the two poppet valves 54 and 55. When the hand wheel 14 is rotated to produce a lighter charge, that is, when the cylinder 25 is operated to raise the ratchet arm 26, a projection 63 on ratchet arm 26 engages a pivoted arm 66 which, in turn, causes a set screw 67 to engage the stem of the poppet valve 54 and admit air to the right side of the control valve 58. This connects the lower end of cylinder 70 to the compressed air supply through conduits 60 and 64 and also connects the upper end of the cylinder 70 to atmosphere through conduits 62 and 65. This compressed air raises the piston 71 in cylinder 70 and opens the valves 38 to increase the amount of fuel supplied to the burner.

Likewise, when the hand wheel is operated to make a heavier charge, that is, when the cylinder 29 is operated to raise the ratchet arm 30, the projection 73 on ratchet arm 23 engages a pivoted arm 68 and forces the set screw 69 into engagement with the stem of the poppet valve 55, as illustrated in Fig. 2, which admits air to the left side of the piston valve 59. The piston valve, in turn, connects conduit 62 with air supply conduit 64, thereby delivering air through conduit 62 to the upper end of cylinder 70. At the same time, the control valve 58 connects the lower end of the cylinder 70 to atmosphere through conduits 60 and 61, permitting the piston 71 to move downwardly so that the valves 38 may close.

In the operation of the device, when the weight regulator, upon the delivery of a charge varying a predetermined amount from a definite standard, operates to supply air to the piston 25 to rotate the ratchet arm 26 and hand wheel 14 to change the weight regulator for making the charge lighter, this same movement raises the pivoted lever 66, opens the poppet valve 54, supplying air to the right end of the control valve 58 through conduit 51, thereby connecting the supply of air through conduit 60 to the lower end of the cylinder 70 to raise the piston 71 and to force valves 38 upwardly in opposition to springs 39 thereby increasing the supplemental supply of fuel to the burner 3. This increases the amount of heat applied to the glass adajacent the discharge orifice and thereby raises the temperature of the glass.

When the weight regulator mechanism 12 is operated to supply compressed air to the cylinder 29 to raise the ratchet arm 30 and to rotate the hand wheel 14 to make the charge heavier, this same operation causes the ratchet arm 30 to raise the pivoted lever 68 and the poppet valve 55 to supply compressed air through the conduit 57 to the left side of the control valve 58, which moves the sliding member 59 to its extreme right position, as shown in Fig. 2. The movement of the member 59 to the right connects the supply of air to the upper end of cylinder 70 through conduits 60 and 62 and, at the same time, connects the lower end of cylinder 70 to atmosphere through conduits 62 and 65. Thus, the piston 71, together with the valves 38, is lowered to decrease the amount of fuel supplied to the burner 8 and the temperature of the glass is permitted to decrease slightly to correct for the irregularities.

It will be understood that, by regulation, the valves 38 are raised or lowered partially, thereby increasing the amount of fuel supplied in increments corresponding to the amount of variation in the size of the charges delivered. All of the fuel gases supplied to the burner may pass through valves 38, the position of the latter determining the amount of fuel delivered to the burner. It will also be understood that, while the temperature control supplements the action of the weight regulator herein, the entire adjustment for irregularities in weight may be effected by changing the temperature of the glass with the present temperature control. This may be done either by the burner now used or by a separate heating means positioned in the vicinity of the discharge orifice.

It will be seen that the present invention provides an effective device and method for automatically controlling the temperature of molten glass adjacent the discharge orifice of a glass feeder to maintain the best working temperature. The device and method effectively eliminate undue irregularities in the sizes of the mold charges and thereby minimize the number of overweight and underweight articles delivered. The invention improves the quality of the ware in addition to eliminating defective ware. The device, while illustrated in connection with a tumbled glass machine, is applicable to existing glass furnaces and feeders, irrespective of the type of glass machines with them, without substantial changes in the construction thereof. Further, the device is inexpensive and rugged in construction and fully capable of withstanding the rough usage to which it may be subjected.

As various changes may be made in the form, construction, and arrangement of parts without departing from the spirit and scope of the invention and without sacrificing its advantages, it is to be understood that all matter herein is to be interpreted as illustrative and not in a limiting sense.

Having thus described my invention, I claim:

1. The method of regulating the temperatures of molten glass being fed to glass machines, which method comprises pressing the charge into shape, measuring the volume of the pressed charge and then utilizing said measured volume for automatically regulating the temperature responsively to the variation in the volume of said charge from a standard volume.

2. The method of maintaining a uniform temperature in a glass furnace adapted to feed charges of glass to glass machines, which method comprises molding a charge of glass, concurrently measuring the volume of the charge and causing the variation of said measured volume from a predetermined standard volume automatically to regulate the temperature of the glass being fed, and also to regulate the weight of the charges independently of the temperature.

3. The method of maintaining uniformity in the volume of glass charges fed to molds of glass machines, which method comprises molding a charge, measuring the size of the charge while being molded and utilizing the variations in the volume of the molded charge to regulate the temperature of the glass being fed in accordance with the variation of said measure from a predetermined standard, whereby the temperature of the glass will be increased by a charge under standard so that the flow will be increased to correct the irregularity.

4. The method of correcting for irregularities in the mold charges fed by automatic glass feeding machinery, which method comprises regulating the weights of charges delivered independently of the temperature of the glass, measuring the volume of a charge in a mold during the forming operation and causing the variation in said measure from a predetermined standard to increase or decrease the fuel fed to burners heating the glass in said furnace for regulating the temperature thereof to facilitate said weight regulation.

5. The method of controlling the feeding of glass charges to molds, which method comprises molding a charge, measuring the volume of the charge in a mold, and simultaneously causing a predetermined variation of the measured volume from a standard volume to regulate the weight of the successive charges and also to regulate the temperature of the glass being fed.

6. The method of controlling the feeding of glass charges to molds, which method comprises molding a charge measuring the volume of the charge during the molding operation and simultaneously causing a predetermined variation of the measured volume from a standard volume to regulate the weight of the charges delivered and also to regulate the temperature of the glass being fed.

7. In a device of the class described, the combination of means for feeding charges from a reservoir of molten glass, devices for regulating the size of said molten charges, and mechanism operated by said devices for controlling the temperature of the molten glass.

8. In a device of the class described, the combination of means for feeding charges of molten glass, devices responsive to the size of the charges fed for regulating the size of subsequent charges, and mechanism operated by said devices for supplementing said regulation by controlling the temperature of the glass being fed.

9. In a device of the class described, the combination of a feeder having an outlet for supplying charges of glass, a burner intermittently operated to heat the glass in said outlet between successive feeding operations, valve means associated with said burner for increasing the amount of fuel fed thereto, means for regulating the size of charges fed by said feeding means independently of the temperature of the glass, said means being adapted to operate said valve means to increase the quantity of fuel fed to said burner when said means is operated to increase the size of the charges of glass fed.

10. In a device of the class described, the combination of means for heating glass in a glass feeder, valve means for increasing the amount of fuel fed to said heating means, devices for regulating the sizes of the charges fed, and pneumatic means operated by said devices for increasing the amount of fuel fed to said heating means.

11. In a device of the class described, the combination of heating means effective upon glass being fed, valves controlling the air and fuel being fed to said heating means, a pneumatic cylinder for operating said valves, and a second pneumatic cylinder adapted to control the operation of said first pneumatic cylinder for increasing or decreasing the amount of fuel fed to said heating means.

12. In a device of the class described, the combination of means having an outlet for feeding charges of glass, molds for receiving said charges of glass, a pressing plunger for pressing the glass in said molds, means for regulating said feeding means independently of the temperature of the glass to control the size of the charges fed, means for heating the glass being fed, pneumatic means for operating said heating means, and means operated by said regulating means for operating said pneumatic means.

13. In a device of the class described, the combination of means for feeding charges of glass, molds for receiving said charges of glass, means for locally heating the glass being fed, means for supplying fuel to said heating means, a cylinder having a piston therein for operating said fuel supply means, means for supplying air to one end of said cylinder when the pressed charges in the mold exceed a predetermined volume and for supplying air to the other end of said cylinder when the volumes of the pressed charges are below a predetermined minimum, and means cooperating with said heating means to regulate size of the charges being fed.

14. The method of regulating the sizes of glass charges fed from a furnace, which method comprises measuring the volume of the charge being fed after the charge has been pressed and utilizing variations in said volume from a predetermined standard to regulate the weight of the charges delivered, and causing changes in the regulation of the weight to effect changes in the temperature of the glass being fed.

15. In a device of the class described, the combination of a feeder for glass machines having an outlet adapted to deliver charges, a burner adapted to apply heat to said outlet and to the glass therein intermediate the feeding of successive charges, means for regulating the sizes of the charges delivered, and devices operated by said means for controlling the fuel fed to said burner.

WILLIAM L. McNAMARA.